United States Patent
Sann et al.

(10) Patent No.: US 6,932,900 B2
(45) Date of Patent: Aug. 23, 2005

(54) FILTER DEVICE

(75) Inventors: Norbert Sann, Riegelsberg (DE); Martin Reik, Saarbrücken (DE); Stefan Hennes, Neunkirchen (DE); Karl-Heinz Leichner, Friedrichsthal (DE)

(73) Assignee: Hydac Filtertechnik GmbH, Sulzbach/Saar (DE)

( * ) Notice: Subject to any disclaimer, the term of this patent is extended or adjusted under 35 U.S.C. 154(b) by 34 days.

(21) Appl. No.: 10/181,042

(22) PCT Filed: Jan. 3, 2001

(86) PCT No.: PCT/EP01/00011
§ 371 (c)(1),
(2), (4) Date: Sep. 30, 2002

(87) PCT Pub. No.: WO01/51167
PCT Pub. Date: Jul. 19, 2001

(65) Prior Publication Data
US 2003/0106847 A1 Jun. 12, 2003

(30) Foreign Application Priority Data
Jan. 14, 2000  (DE) .......................................... 100 01 259

(51) Int. Cl.[7] ............................................. B01D 35/157
(52) U.S. Cl. ...................... 210/116; 210/130; 210/316; 210/323.2; 210/430; 210/437; 210/450; 210/456
(58) Field of Search ................................. 210/130, 136, 210/304, 323.2, 340, 418, 429, 435, 437, 441, 442, 450, 454, 455, 456, 457, 497.01, DIG. 17, 116, 117, 253, 254, 261, 316, 430, 502; 184/6.24

(56) References Cited

U.S. PATENT DOCUMENTS

| 3,344,923 A | | 10/1967 | Pall et al. |
| 4,655,914 A | | 4/1987 | Wada |
| 4,915,837 A | * | 4/1990 | Verity ......................... 210/456 |
| 5,298,158 A | * | 3/1994 | Anderson ................... 210/168 |

FOREIGN PATENT DOCUMENTS

| DE | 1951668 | 4/1971 |
| DE | 4221897 | 1/1994 |
| GB | 860871  | 2/1961 |
| GB | 965328  | 7/1964 |

* cited by examiner

Primary Examiner—Matthew O. Savage
(74) Attorney, Agent, or Firm—Roylance, Abrams Berdo & Goodman L.L.P.

(57) ABSTRACT

A filter device includes a filter housing (10) in which at least two filter elements (12, 14) with differing filter grades of filter material (16) are arranged. The filter elements are partially separated from each other by a separating device (18), with a through channel (24) of predetermined cross-section for a hydraulic connection between neighboring filter chambers (20, 22),. The filter chambers arranged prior to the filter materials (16) in the flow direction of the fluids for filtering. The filter device permits a combination of main- and side-stream filters in the smallest possible space, whereby very good purity levels for the filtered fluid are nevertheless achieved.

11 Claims, 2 Drawing Sheets

FILTER DEVICE

FIELD OF THE INVENTION

The present invention relates to a filter device with a filter housing in which at least two filter elements with filter materials of different filtration grades are mounted. The filter elements are partly separated from each other by a separating device having a passage point of assignable cross-section for a fluid-conducting connection of adjacent filter spaces. The filter spaces are situated upstream from the filter materials in the direction of flow of the fluid to be cleaned.

BACKGROUND OF THE INVENTION

U.S. Pat. No. 3,344,923 describes a filter unit with two filter elements in the form of hollow cylinders. Both elements are of the same filtration grade. The filter elements are mounted in a common housing so that their longitudinal axes are in alignment. The two filter elements are separated from each other by a separating device extending transversely to the longitudinal axes. At the same time, the filter space (unfiltered fluid space) situated upstream from the filter materials in the direction of flow of the fluid to be cleaned is divided into two subspaces, between which a fluid-conducting connection may nevertheless be established by a valve installed in the separating device. This valve is a bypass valve and initially is closed. Opening of the valve occurs only when a certain pressure difference is present between the two subspaces as a result of increased fouling and accordingly decreasing permeability of the first filter element as viewed in the direction of fluid flow. The second filter element, which serves as reserve unit, can gradually assume the function of the first filter element to ensure uninterrupted trouble-free filtering operation. No provision is made for uninterrupted filtration operation with a primary flow and secondary flow filter of different filtration grades qualities.

GB 860 871 A discloses a generic filter device in which the fluid flow and accordingly the pressure relationships between the two subspaces associated with the first or second filter element are affected both in the unfiltered material space and on the filtrate space side. Here, the two filtrate partial flows emerging from the two filter elements are initially conducted separately by a tapering spiral spring whose narrower end is rigidly connected to the outlet opening for the partial flow of filtrate discharged from the finer, and thus, less permeable filter element. The wider free end of the spiral spring is loosely connected to the space surrounding it into which the partial filtrate flow of the coarser, and thus, more easily permeable filter element is discharged. The latter generates at the open end of the spiral spring vortices which exert a suction effect on the interior of the spiral spring. The influx of the filtrate partial flow from the finer filter element into the filtrate partial flow of the coarser filter element is consequently promoted. The suction effect increasing with increase in the fluid flow rate ultimately causes the turns of the spiral spring, previously closed in the direction of the longitudinal axis of this spring, to separate, so that the separation of the two filtrate partial flows along the spiral spring is eliminated and the pressure decrease accompanying the vortex formation is limited. When this conventional solution is applied, only the primary flow filter is in use when the fluid passage amounts are very low and very high. Only in the intermediate moderate fluid passage areas is filtration by the secondary filter mounted parallel to the primary filter initiated, something which is detrimental to the purity of the filtrate during filtration operation as a whole. No provision is made for use of the secondary filter during the filtration operation in question.

SUMMARY OF THE INVENTION

Objects of the present invention are to provide an improved filter device for increased purity of the filtrate with every specific filtration grade of the filter elements, during the entire filtration process.

According to the present invention, the throttle point of the other passage point is in the form of a fluid valve provided with an assignable closing pressure which increases the prestress pressure inside the filter element with the coarser filtration grade. The result obtained in this manner is that under all operating conditions of the filter device, that is, regardless of the respective fluid throughput, a relatively high percentage of the fluid to be filtered is conducted through the filter element with the finer filtration grade, so that the purity as a whole of the filtrate flow being discharged is increased.

This arrangement permits combination of a primary flow filter and secondary flow filter in one filter housing. In view of the different filtration grades of the filter materials employed, the filter with the coarser filtration grade serves as primary flow filter, and thus, receives the greater part of the flow volume to undergo particle removal. The filter element with the finer filtration grade in contrast removes particles from a smaller flow volume. Such cleaning by primary and secondary current filters results in very good purity quality, even though the greater share of volume of the fluid to be cleaned is subjected to coarse filtration. This filter device is very compact in structure and in general requires a small number of structural components. This condition both increases reliability in operation and keeps manufacturing, installation, and maintenance costs low. High precision of current volume division can be achieved for primary and secondary flow filtration by the passage point of assignable cross-section inside the separation device. This passage point improves the quality of filtration of the fluid to be cleaned.

In a preferred embodiment of the filter device of the present invention the filter housing has an inlet point for the fluid to be cleaned and an outlet point for the cleaned fluid. The filter element with coarser filtration grade is mounted adjacent to the inlet point. The filter element with finer filtration grade is opposite the former and adjacent to the outlet point. As a result, the flow of fluid through the filter from the inlet point to the outlet point is especially favorable.

In another preferred embodiment of the filter device of the present invention, the separating device has a separating plate connected to the filter housing for sealing. The filter housing is divided into two adjacent housing subspaces. The ends of the adjacent filter elements are in contact with the separating plate provided with an additional passage point for connection of the interiors of these filter elements. One housing subspace containing the filter element with coarser filtration grade has the filter space which is connected to the inlet point to conduct fluid. The other housing subspace containing the filter element with finer filtration grade has the other filter space connected through this filter element to the outlet point to conduct fluid. In addition, one filter space is connected by the passage point to the other filter space to conduct fluid. An especially compact structure of the filter device as a whole is obtained. Such structure does not require a complete filter housing of its own, but is also suitable for installation on the tank side with an integrated filtering jug.

In another especially preferred embodiment of the filter device of the present invention, the filter elements are mounted coaxially relative to each other inside the filter housing and are introduced into the element receptacles with their free ends facing away from each other. The filter materials of the filter elements preferably rest on support elements, which are modular in structure and can be adapted to various longitudinal dimensions of the filter elements. In this way, a modular structure can be achieved on the whole for the filter device, and can be adapted cost effectively to a wide variety of applications.

In another especially preferred embodiment of the filter device of the present invention, one passage point includes a curved passage segment, and the other passage segment has a throttle point such that the flow resistance is increased for the filter element with the coarser filtration grade. A corresponding throttle function is also assigned to the first passage point to ensure the effectiveness of the secondary flow filter independently of the actual situation relative to fouling of the primary flow filter. In particular, the volume flows inside the filter device throttle points may be coordinated, so that reasonable division into primary flow and secondary flow filtration is achieved. Relative to the throttle point, the additional passage point is preferably in the form of a fluid valve which applies an assignable closing spring pressure to the closing element in the direction of the additional passage point. As a result, a preloading situation arises for the housing subspace with the filter element with coarser filtration grade and the fluid to be filtered is forced, as a function of the preloading selected, to pass appropriately through the first passage point acting as throttle point into the partition between the housing subspaces for secondary flow filtration.

In another preferred embodiment of the filter device of the present invention, at least the filter element with the coarser filtration grade is provided with a bypass valve. If complete clogging of the primary flow filter occurs, the bypass valve opens and the supply of hydraulic fluid continues to be ensured. This ability is important if the device is appropriately inserted upstream from hydraulic machine tools or devices. However, the secondary flow filtration is optionally continued only to a limited extent regardless of the bypass situation. Preferably, provision is also made such that at least one of the filter materials, preferably the filter material with the finer filtration grade, possesses moisture absorption properties. As a result, harmful moisture can be removed from fluid circulation by way of the filter device in primary and secondary flow filtration.

It has been found to be especially advantageous to design the passage points so that one part by volume which flows as secondary flow through the filter element with the finer filtration grade corresponds to eight to ten parts by volume in the primary flow which moves through the filter element with the coarser filtration grade.

Other objects, advantages and salient features of the present invention will become apparent from the following detailed description, which, taken in conjunction with the annexed drawings, discloses a preferred embodiment of the present invention.

BRIEF DESCRIPTION OF THE DRAWING

Referring to the drawings which form a part of this disclosure.

DETAILED DESCRIPTION OF THE INVENTION

Figure 1:
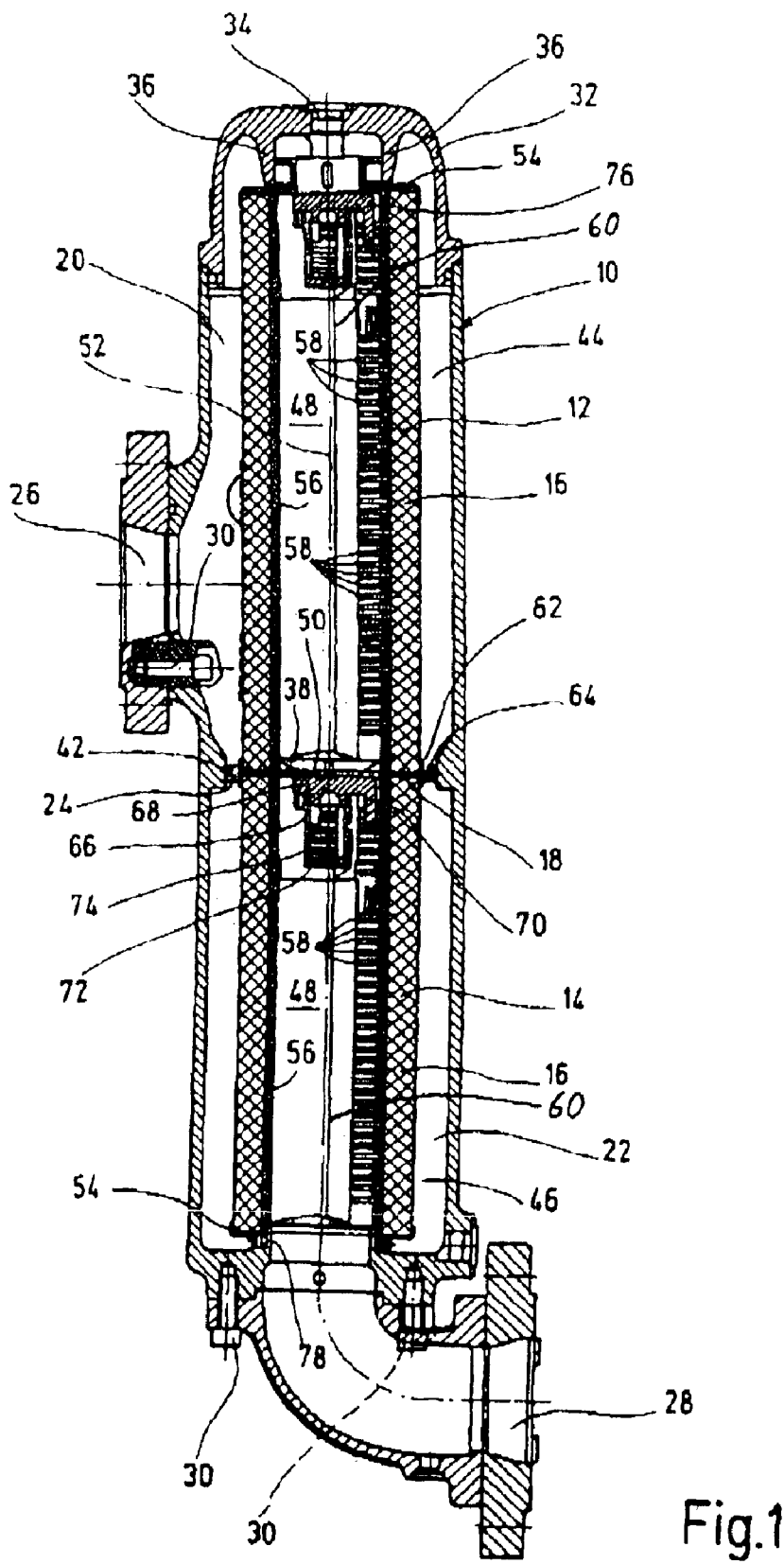
FIG. 1 is a side elevational view in section of the filter device, as installed, according to an embodiment of the present invention.

The filter device shown in FIG. 1 has a filter housing 10. Two filter elements 12,14 are mounted one above the other in the filter housing. The filter elements in question 12,14 have different filtration grades. These filtration grades may be determined by use of different filter materials 16 or the same filter materials 16 with different permeability values. The filter materials 16 may be in the form of hollow cylinders, but preferably have pleated filter matting, that is, matting folded like an accordion. In particular, filter materials 16 of a plastic substance may be employed in this application.

The two filter elements 12,14 are partly separated from each other spatially and with respect to external conduct of fluid by a separating device 18. An enlarged top view of the separating device 18 is presented in FIG. 3. For a fluid-conducting connection between the two adjacent filter spaces 20,22, this separating device has a passage point 24 upstream from the filter materials 16 in the direction of flow of fluid inside the filter device for the fluid to be cleaned. The filter housing 10 has an inlet point 26 for the fluid to be cleaned or filtered and an outlet point 28 for the fluid cleaned. The filter element 12 with the coarser filtration grade is mounted on the side adjacent to the inlet point 26, while the filter element 14 with the finer filtration grade is mounted on the side adjacent to the outlet point 28. Both the inlet point 26 and the outlet point 28 are in the form of an inlet flange or outlet flange. These flanges are connected to the housing 10 by appropriate screw connections. The flange-like inlet point 26 may be connected to a fluid feed carrying fouled fluid inside a hydraulic circuit and tapers in extension to promote fluid inlet flow in the direction of the filter space 20.

In addition, the inlet point 26 is mounted closer to the separating device 18 in the filter housing 10 than to the upper cover plate 32 of the filter housing 10. The cover plate 32 is in turn connected by a screw connection (not shown) to the rest of the hollow cylindrical filter housing 10 and is sealed to this hollow cylinder wall by a conventional O-ring. The filter device may be ventilated by a sealing connection 34 on the upper end of the cover plate 32, or, for example, may be connected to a fluid fouling indicator (not shown). In any event, after removal of the cover plate 32, it is possible to replace the filter unit itself containing filter elements 12 and 14 with a new unit when fouling reaches a particular level. In addition, the cover plate 32 has on its inner side mounting connectors 36 pointing inward which may be joined together in one piece in the form of a connector ring.

The separating device 18 essentially comprises a separating plate 38 connected to the interior of the filter housing 10 to effect sealing. For this purpose, the separating plate 38 has a grooved annular channel 40 extending over its outer lateral circumference and a conventional O-ring 42 received in channel 40 to effect sealing. The separating plate 38 is preferably in the form of an injected plastic element, and thus, can be cost effectively manufactured. By the separating plate 38, the filter housing 10 is divided into two adjacent housing subspaces 44,46. The adjacent filter elements 14,16, with their ends facing each other as shown in FIG. 1, are frontally in contact with the separating plate 38 provided for connection of the interiors 48 of these filter elements 12, 14 to another passage point 50. One housing subspace 44 with the filter element 12 with the coarser filtering grade has the filter space 20 connected directly to the inlet point 26 to conduct fluid. The other housing subspace 46 with the filter element 14 with the finer filtering grade, on the other hand, has the other filter space 22 connected by way of this filter element 14 to the outlet point 28 to conduct fluid. The filter elements 12,14 are mounted coaxially with each other inside the filter housing 10, that is, along the common longitudinal axis 52.

Figure 2:
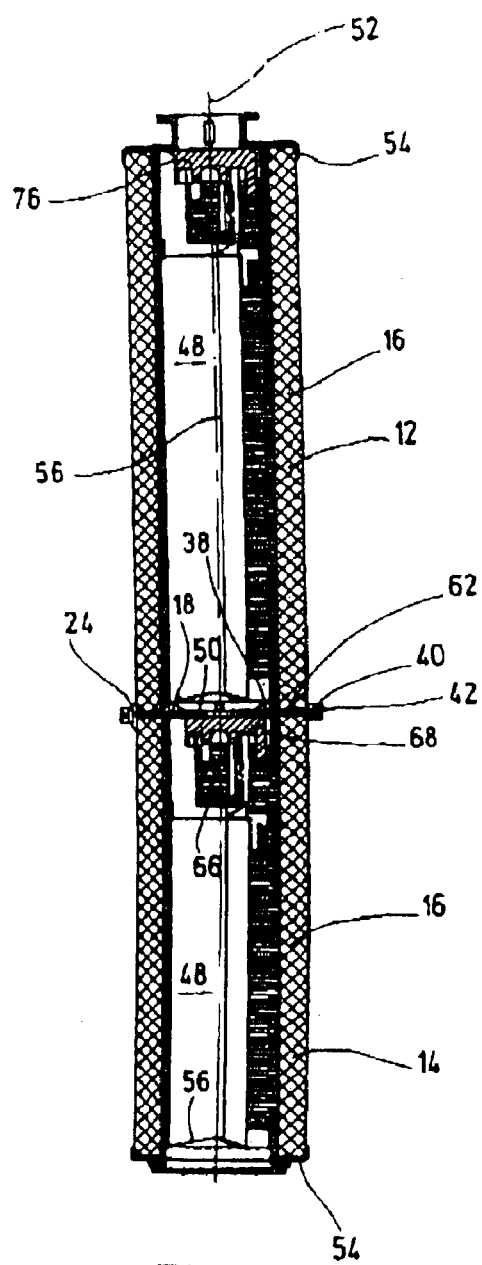
FIG. 2 is a side elevational view in section of the primary and secondary flow filter units in FIG. 1.

The longitudinal dimension selected for the upper filter element 12, as seen in the line of sight to FIGS. 1 and 2, is somewhat larger than that of the subjacent or lower filter element 14. In addition, the free ends of the filter elements 12,14 facing away from each other are introduced into element receptacles 54, which in turn are connected to support pipes 56 on the inside of the filter elements 12,14. The support pipes 56, to form support elements, have individual support leaves 58 delimiting free fluid passage points therebetween. The support pipes 56 may be built in modular form, that is, they may have individual segmental elements that may be joined to each other and mounted in sequence as a function of the longitudinal dimension required. In addition, the support pipes 56 are of plastic materials and internally have support studs or flanges 60 extending diametrically toward each other. The structure of support pipes 56 is conventional, so that no detailed discussion thereof is needed at this point. The support studs 60 may impart a specific direction to the flow of fluid inside the respective filter element 12,14. This flow favors energy conservation in filtration operation. The support studs 60 do not hamper passage of fluid from the filter element 12 into the following passage point 50 or transition of the interior 48 of the filter element 14 in the direction of the curved flange-like outlet point 28. The filter elements 12,14 are cylindrical in form and have hollow cylindrical interiors for conducting fluid.

Figure 3:
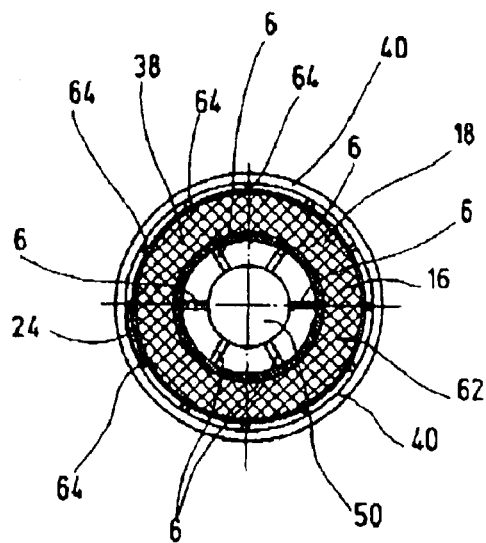
FIG. 3 is an enlarged top plain view of the separating device shown in FIGS. 1 and 2.

On the ends adjacent to each other, the filter elements 12,14 are received correspondingly into an annular recess 62 in the separating plate 38. For this purpose, the separating plate 38 has a corresponding receptacle extension on the side of the external circumference, that is, one which extends upward and downward. In the direction of the interior, the filter elements 12,14 are supported again by the end areas of the support pipes 56, which in this area are in contact with the separating plate 38. The ring channel 40 is in turn fastened to the annular recess 62 and is reinforced by diametrically opposite studs 6 and 64. As shown in FIG. 3 in particular, the passage point 24 is in the form of a curved passage segment which extends between two adjacent connection studs 64. The other passage point 50 forms a throttle point such that the flow resistance is increased for the filter element 12 with the coarser filtration grade. Throttle point 50 is in the form of a fluid valve 66 having the closing element 68 pressed in the direction of the additional passage point 50 with an assignable spring closing pressure. The closing element 68 has guide flanges 70 distributed on the circumference side which permit precise control of the closing element 68 inside the lower support pipe 56. In addition, a support plate 72 of the fluid valve 66 is rigidly connected to the lower support pipe 56, and a closing spring 74 in the form of a pressure spring rests with its one of its free ends against this support plate 72 and with its other free end on a radial recess in the closing element 68 of the fluid valve 66.

The fluid valve 66 is shown in its closed position in FIGS. 1 and 2. The lower end of the upper support pipe structure 56 positioned above valve 66 is shown in outline. The support studs or flanges 60 of the upper support pipe 56 do not disrupt the operation of the fluid valve 66. The fluid valve 66 is provided with an assignable closing pressure which increases the preloading pressure in the interior 48 of the upper filter element 12. The fouled fluid passing through the corresponding filter material 16 is then slowed by the increased preloading pressure. Also, the tendency of the fouled fluid to flow through the first passage point 24 in the separating plate 38 to the additional filter element 14 with finer filtration grade becomes greater. This arrangement accordingly prevents occurrence of filtration in the primary flow only by the upper filter element 12, with hardly any filtration in the secondary flow by the lower filter element 14.

The filter element 12 with the coarser filtration grade is provided on its upper end with a bypass valve 76 to prevent operational failures as soon as the primary flow filter with the upper filter element 12 becomes completely clogged. In such a case, the bypass valve 76 opens and permits flow of the uncleaned fluid in the primary flow through the interiors 48 of the upper filter element 12 and lower element 14 to the outlet point 28. The bypass valve 76 is comparable to the fluid valve 66 in structure. The description of valve 66 also applies to the bypass valve 76.

To eliminate moisture from the fluid, the filter material 16 of the lower filter element 14 has moisture-absorbent layers. The filter material 16 of the lower filter element 14 may also be made entirely of moisture-absorbent layers.

The filter elements 12 and 14 are geometrically more or less identical except for their length and filtration grades. Particularly, internal and external diameters correspond to each other. In addition, the filter elements 12, 14, together with the associated valves 66 and 76 and with their support pipes 56 and the support plate 38 form one structural unit. This structural unit may be replaced in its entirety by a new such unit. Replacement is effected by way of the upper cover plate 32. This structural unit may be disposed of in environment-friendly fashions, incinerated, or recycled. So that the structural unit will also be retained securely in the housing 10, not only is it supported by the separating plate 38 on the housing side, but, in the area of the lower outlet point 28 a ring-shaped filter element receptacle 78 is provided onto which the structural unit may be slipped by its lower filter clement 14. The interior 48 of the lower filter element 14 is sealed fluid-tight from the lower filter space 22 by an O-ring seal. The filtration grade selected for the filter materials 16 is such that a coarse filtration grade value of 20 $\mu$m, for example, is selected for the upper filter element 12, while the lower filter element has a relatively fine filtration grade of, for example, 2 $\mu$m.

With the filter device of the present invention, a primary flow filter 12 is accommodated with a secondary flow filter 14 in a filter housing 10 having only one inlet 26 and one outlet 28. The filter housing 10 may also have exclusively one compartment (this design is not shown), for example, if use in a tank with integrated filter cup is involved. The division into primary and secondary flow filters may be even further graduated, with more than two filter elements 12,14 (not shown) positioned in parallel being mounted in sequence. More finely graduated filtering capabilities may accordingly be provided for multiply separable volume flows. Again, the filter elements may in turn be designed to be in multiple parts, to the extent that this should be necessary out of considerations of practicability. In any event, the filter device illustrated makes it possible to cause a hydraulic flow of large volume of a relatively coarse filtration grade, for example, 20 μm absolute, and a hydraulic flow of low volume, for example 2 μm absolute, to flow through the device in parallel. The volume flows are coordinated by internal flow control by the orifices or throttles in relation to the passage points 24 and 50. Introduction of additional throttles or orifices as a function of the flow control desired would also be possible.

In order to ensure efficiency for the secondary flow filter 14 independently of fouling of the primary flow filter 12, the throttle device is integrated into the outlet of the primary flow filter 12 and in the housing 10 between the upper and lower parts of the filter element. The filter device provides a compact operating, installation, and service unit to be provided for applications both in the high-pressure and the low-pressure area (in return-flow and in secondary-flow lines).

In the embodiment illustrated, the passage points 24,50 are designed so that for one part by volume flowing in the secondary flow through the filter element 14 with finer filtration grade, there are to eight to ten parts by volume flowing in the primary flow through the filter element 12 with the coarser filtration grade. For the secondary flow operation in question, one fouled quantity of flow from the upper filter space 20 is diverted from the primary flow direction by the passage point 24 in the separating plate 38, and in this way is transferred to the lower filter space 22 for finest filtering by the secondary flow filter 14. All fluid components filtered by the filter materials 16 in any event reach the outlet side 28 of the device through the interiors 48 of the filter elements 12,14.

While one embodiment has been chosen to illustrate the invention, it will be understood by those skilled in the art that various changes and modifications can be made therein without departing from the scope of the invention as defined in the appended claims.

What is claimed is:

1. A filter device, comprising:
    a filter housing having first and second filter chambers in a direction of flow of fluid to be filtered through said housing;
    first and second filter elements being located in said housing downstrenm of said first and second filter chambers, respectively, being connected in parallel relative to one another, having first and second filter materials, respectively of different filtering grades and having inside ends facing one another, said first filter material having a coarser filtering grade than said second filter material;
    a separating plate contacting said inside ends and separating said first and second filter elements;
    a first passage in said separating plate providing fluid communication between said first and second fluid chambers; and
    a second passage in said separating plate providing fluid communication between inner chambers of said filter element and receiving a fluid valve for closing said second passage to form a throttling point, said fluid valve having a pre-settable closing pressure to increase pressure in said inner chamber of said first filter element.

2. A filter device according to claim 1 wherein
    said filter housing comprises an inlet to receive fluid to be filtered, and an outlet to discharge filtered fluid;
    said first filter element is adjacent said inlet; and
    said second filter element is adjacent said outlet.

3. A filter device according to claim 2 wherein
    said separating plate is sealingly connected to an inside surface of said filter housing, and separates said filter housing into adjoining first and second partial housing chambers.

4. A filter device according to claim 3 wherein
    said first partial housing chamber contains said first filter element and said first filter chamber, said first filter chamber being in fluid communication with said inlet; and
    said second partial housing chamber contains said second filter element and said second filter chamber, said second filter chamber being in fluid communication with said outlet through said second filter element.

5. A filter device according to claim 1 wherein
    said first and second filter elements are arranged coaxially in said filter housing, and comprise free ends, opposite said inside ends, held in element locations.

6. A filter device according to claim 1 wherein
    said filter materials are supported by modular supporting bodies adaptable to various lengths.

7. A filter device according to claim 1 wherein
    said first passage comprises an arcuate passage segment.

8. A filter device according to claim 1 wherein said fluid valve comprises a closing part biased toward said second passage by said pre-settable closing pressure.

9. A filter device according to claim 1 wherein
    said first filter element comprises a by-pass valve; and
    at least one of said filter materials comprises water-absorbing properties.

10. A filter device according to claim 1 wherein
    said first and second passages allow eight to ten volume units to be conveyed in a main flow through said first filter element for each volume unit to be conveyed through said second filter element.

11. A filter device according to claim 1 wherein
    said fluid valve completely closes said second passage in a closed position thereof, thereby terminating fluid communication between said inner chambers.

* * * * *